United States Patent

Schlichte

[15] 3,686,442

[45] Aug. 22, 1972

[54] PROCESS AND CIRCUIT ARRANGEMENT FOR THE TRANSMISSION OF MESSAGE SIGNALS, IN PARTICULAR PCM MESSAGE SIGNALS, FROM A TRANSMISSION STATION TO A RECEIVING STATION

[72] Inventor: Max Schlichte, Maxhofstrasse 30a, 8000 Munich, 71, Germany

[22] Filed: Sept. 29, 1970

[21] Appl. No.: 76,492

[30] Foreign Application Priority Data

Sept. 29, 1969 Germany..........P 19 49 155.5

[52] U.S. Cl...............................................179/15 BY

[51] Int. Cl...............................................H04j 3/12

[58] Field of Search..179/15 BA, 15 BS, 15 BY, 15 AS; 178/69.5 R

[56] References Cited

UNITED STATES PATENTS 3,311,707 3/1967 Urquhart-Pullen....179/15 AS

*Primary Examiner*—Ralph D. Blakeslee
*Attorney*—Birch, Swindler, McKie and Beckett

[57] ABSTRACT

A process and apparatus for transmitting and receiving pulse code modulated message signals are described. Time multiplex transmission techniques are used. Succeeding time slots in a given pulse frame are assigned to connections, and the address signals associated herewith follow each other in an increasing order of rank. Each of the address signals are transmitted in the form of individual signal elements in the aforementioned order of rank and in time elements assigned to each particular connection within separate time ranges of the pulse frames.

8 Claims, 3 Drawing Figures

United States Patent
Schlichte
[15] 3,686,442
[45] Aug. 22, 1972
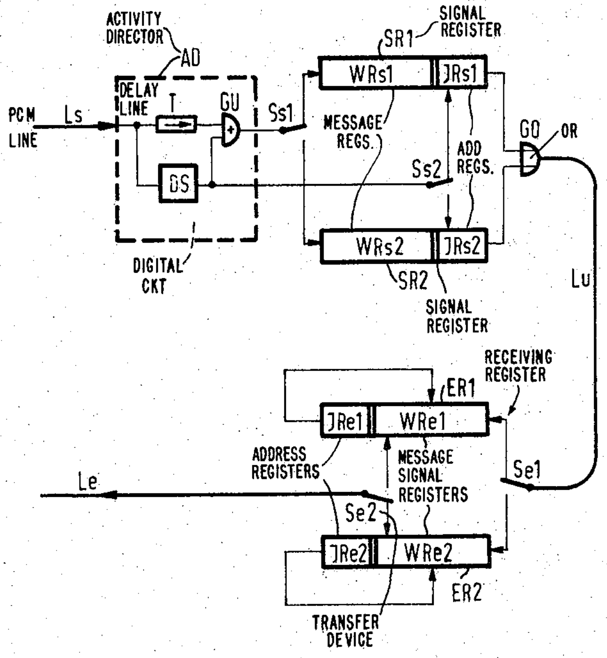

PROCESS AND CIRCUIT ARRANGEMENT FOR THE TRANSMISSION OF MESSAGE SIGNALS, IN PARTICULAR PCM MESSAGE SIGNALS, FROM A TRANSMISSION STATION TO A RECEIVING STATION

BACKGROUND OF THE INVENTION

In connection with the transmission of message signals from a transmission station to a receiving station, one has frequently turned, for a better utilization of the transmitting capacity existing in each case, to the transmission of the message signals from the transmission station to the receiving station according to the time division multiplex principle. In this manner it is possible to practically simultaneously conduct a plurality of connections, for example 100 connections, over one single connection path.

It is already known for the better utilization of the transmitting capacity available in each case between a transmission station and a receiving station to use the so-called TASI principle. In such a known message transmission installation there occurs an automatic change in the time assignment of a relatively low number of transmission channels to a larger number of signal sources and signal receivers. In the said known message transmission installation, scanning systems are provided which supervise the signal sources in each case to see if they emit signals. The known message transmission installation further possesses a control arrangement which connects the active signal sources with the transmission channels according to the signal condition thereof. On the receiving side there is provided a store into which an identification signal, characteristic for each signal source, is stored. The said identification signals are transmitted, over the voice transmission channels, selected for the voice transmission in each case, prior to each new speaking segment. With the aid of the thus transmitted identification signals the receivers for which the speaking segments are intended can then be identified. As the identification information transmitted in the speaking channel in each case must designate that receiver for which the connection signal in each case is intended, a relatively great number of signal elements is required for the representation of the identification information. Thereby, the control expenditures on the transmission and receiving side are also relatively high.

It is an object of the invention to show a way to proceed to optimally utilize in the transmission of message signals from a transmission station to a receiving station, proceeding according to the time division multiplex principle, the time slots available in each case with the least possible load through identification informations for a transmission of message signals.

SUMMARY OF THE INVENTION

To achieve the above and other objects the invention proceeds from a process for the transmission of message signals, in particular PCM message signals, from a transmission station to a receiving station according to the time division multiplex principle, utilizing the time slots available in connections just then conducting no message signals, for the transmission of message signals pertaining to connections, and transmission of address signals identifying the connections in each case. According to the invention, this process is characterized by the fact that the time slots succeeding each other within the pulse frame in question, are assigned to connections. The address signals which succeed each other in a certain, in particular increasing, order of rank, and the address signals of the connection in each case are transmitted in the form of individual signal elements in the said order of rank in time elements permanently assigned to the connections in each case, within separate time ranges of the pulse frames.

In contrast to the method of transmission used in the above considered known message transmission system for the transmission of message signals from a transmission station to a receiving station, the method according to the invention has the advantage that the time slots provided for a message signal transmission are seized in each case only by message signals, and thus an increased utilization of the transmission capacity is achieved. Moreover, the process according to the invention has the advantage that relatively simple address signals representing addresses can be used, so that also the address generation systems provided in the transmission station, and the evaluation systems provided in the receiving station, can be realized in a simpler way than in the above considered known message signal transmission system.

According to a suitable development of the invention, in each pulse frame the address signals of all connections are transmitted in each case to which the message signals, transmitted in the pulse frames in question, pertain. This results in the advantage that in the receiving station in each pulse frame a distribution of the message signals transmitted in each case can be carried out with the aid of the address signals available in each case, which is particularly of importance if the assignment between the individual time channels, or time slots, and the connections in each case changes quickly.

According to a further suitable development of the invention, there are transmitted in successive pulse frames the address signals in each case of other connections, to which message signals, transmitted in the pulse frame in question pertain. This measure, which is especially useful, if the assignment between the time channels, or time slots, in each case and the connections in each case changes only after relatively long time periods, includes the advantage that on the transmission side as well as on the receiving side of a message transmission system operating according to the invention especially simple addressing or evaluation systems are sufficient.

According to a still further, especially suitable development of the invention, upon subdividing the connections totally establishable between the transmission station and the receiving station into single groups within successive pulse frames, the address signals of another group of these connections in each case are transmitted in cyclic succession. There results the advantage of an especially clear distribution of the addresses in each case and thus an especially simple possibility of evaluation of such addresses.

To carry out the process according to the invention it is suitable to use a circuit arrangement which is characterized by the fact that a supervision system pertains to the transmission station which supervises the appearance of message signals emitted by signal transmitters, and stores the address signals of the connections to which these message signals pertains in a sequence corresponding to the sequence of the appearance of the message signals in the form of individual signal elements into storage places, permanently assigned to the connections in each case, of an address signal register that to the supervision system a message signal register is assigned, which possesses a storage capacity corresponding to the maximum number of time channels available altogether between the transmission station and the receiving station for a message signal transmission and which receives message signals appearing successively in each pulse frame in an amount corresponding to its storage capacity in corresponding sequence, and during a following, in particular the next following pulse frame transmits them together with the address signal, to the receiving station in which an appropriate receiving register receives the address signals and the message signals and effects the forwarding of the message signals with the aid of the address signals in question during a following, in particular the next following pulse frame. This circuit arrangement is characterized by the advantage of an especially simple construction: it requires relatively few switching elements, whereby the operating reliability of a message transmission installation using this circuit arrangement is relatively high.

According to a suitable development of the invention there are provided in the transmission station and in the receiving station in each case two receiving registers into which alternately in successive pulse frames signals are stored and out of which the signals are again taken, in appropriate sequence, in the next following pulse frames. This measure has the advantage that practically without interruption message signals can be transmitted from the transmission station to the receiving station.

According to a still further suitable development of the invention the supervision system possesses a signal evaluation circuit which transmits upon the appearance of message signals having a specified minimum aplitude, an outlet signal to an inlet of a coincidence circuit, to the other inlet of which the message signals are conveyed over a delay link, the delay time of which corresponds to the processing time of the signal evaluation circuit. This measure has the advantage that message signals for the transmission whereof a time slot is to be made available within the pulse frame in question, are detected in a relatively simple manner.

BRIEF DESCRIPTION OF THE DRAWINGS

In the following the invention is explained in more detail with the aid of drawings.

DETAILED DESCRIPTION OF THE DRAWINGS

Figures 1, 2:
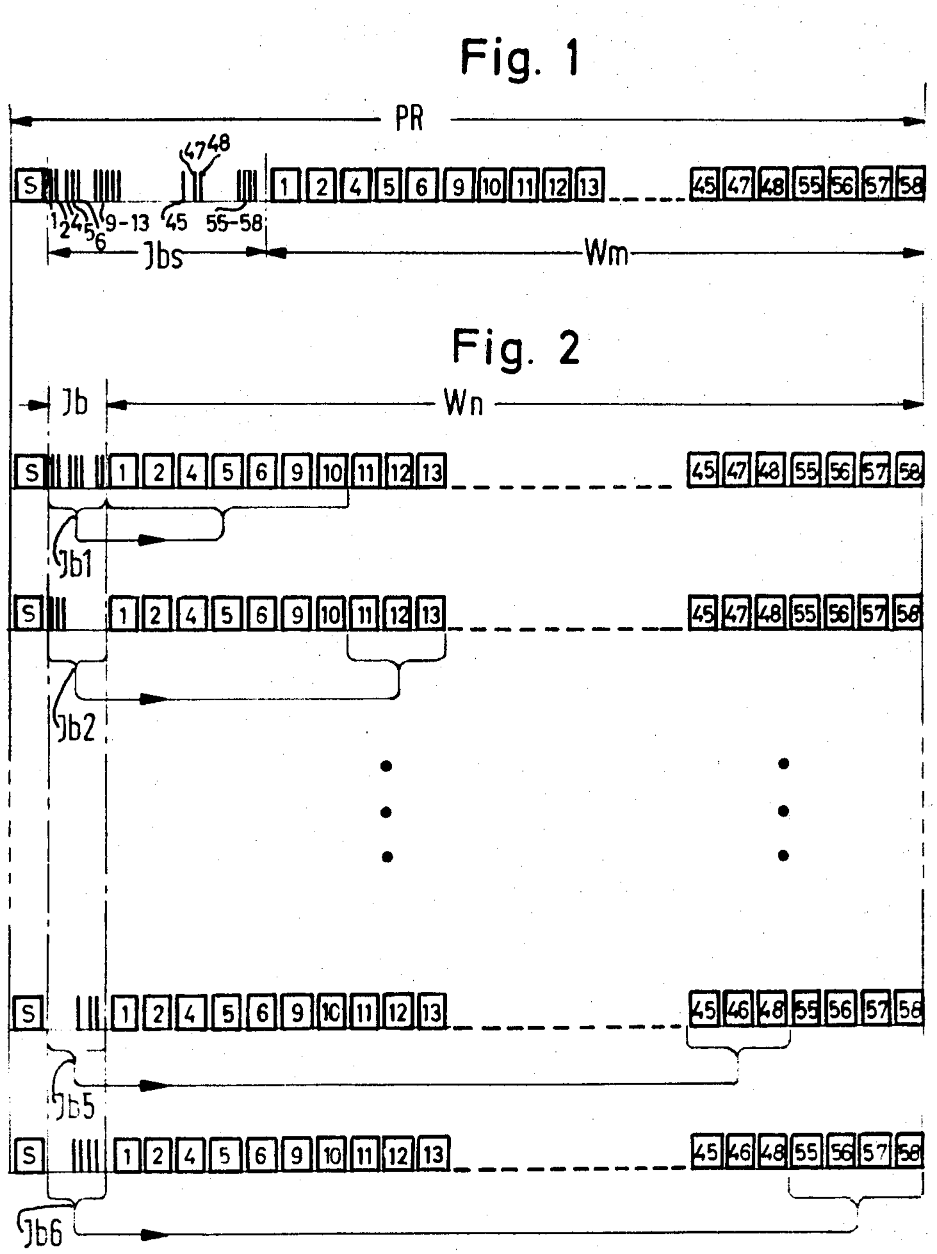
FIG. 1 shows in a diagram an exemplary mode of action of a transmission installation operating according to the process of the invention, corresponding to a first development form.
FIG. 2 shows in a diagram an exemplary mode of action of the process according to the invention, applying it in a transmission installation according to a second development form.

Before considering the details shown in the drawings, some preliminary comments are made with regard to the transmission principle applied in the present invention. As has already been mentioned introductorily, the process according to the invention is used in a message transmission system in which the individual message signals are transmitted according to the time division multiplex principle from a transmission station to a receiving station. Thereby, the individual message signals, or the elements thereof, are transmitted in each case in time slots of time channels which are assigned to such connections, or can be assigned thereto. The time slots of the time channels in question appear repeatedly, in cyclic manner, under formation of successive pulse frames. Thereby each pulse frame comprises in each case a time slot of all available time channels.

After having considered above the principle of message signal transmission, according to which the process according to the invention operates, the diagram shown in FIG. 1 shall now be considered in more detail. The diagram in question shows the time condition within a pulse frame PR wherein in each case one time slot of the time channels available for a message signal transmission lies. These time slots appear in a time range W*m* of pulse frame PR. In addition to time range W*m* pulse frame PR has a further time range I*bs*, wherein address signals used as addresses are transmitted. This will be considered in more detail in the following. In addition to the considered time ranges pulse frame PR also possesses a time range S, which can serve to transmit synchronization signals within the pulse frame PR in question.

With regard to the above considered diagram, shown in FIG. 1, it shall be assumed that pulse frame PR comprises within time range W*m* a total of 24 time slots with 8 time elements each, that time range I*bs* comprises a total of 60 time elements and that time range S comprises eight signal elements. Thus within the time range W*m* a total of 24 message signals, i.e., PCM message signals, comprising eight bit each, are transmitted. In time range I*bs* a total of 60 signal elements, or address signals, can be transmitted. Within time slot S a word comprising eight bit can be transmitted in pulse frame PR. The available 24 time channels can now be used according to the invention to transmit, practically at the same time, a total of 60 message signals pertaining to different connections. For this purpose the time slots succeeding one another within the pulse frame in each case, such as pulse frame PR, (within time range W*m*) are assigned to connections the address signals of which succeed one another in a specific order of rank, in the instant case increasing order of rank. In FIG. 1 the addresses are entered into the individual time slots in arabic numbers. Accordingly the message signal transmitted in the first time slot within time range W*m* pertains to connection 1, while the next following message signal pertains to connection 2. Accordingly the next to the last message signal transmitted within time range W*m* in pulse frame PR pertains to the connection with address 57, while the last message signal transmitted within the time range in question pertains to the connection with address, or number 58. The addresses designating the connections in question are transmitted in the form of signal elements in each pulse frame within time ranges I*bs*, i.e. in time elements which are permanently assigned to the connections in question according to the above said order of rank. Accordingly, the signal elements appearing in the individual time elements of time range I*bs* designate in each case those connections in reference to which in the next following time range W*m* a message signal is transmitted. In the drawing the individual address signals within time range I*bs* are designated by the same arabic numerals as the message signals appearing in the next following time range W*m*.

While it is assumed under the conditions forming the basis of FIG. 1 that within each pulse frame, such as pulse frame PR, the addresses of all connections are transmitted in the course of which within the pulse frame in each case message signals are transmitted, FIG. 2 represents the case where, for successive pulse frames the addresses of other connections in each case are transmitted, in the course of which within the pulse frame in each case message signals are transmitted. It is assumed thereby that all of the connections establishable between the transmission station and the receiving station are subdivided into individual groups and that within successive pulse frames the addresses of another group of these connections in each case are transmitted. One further proceeds in such a way that the address transmission in question is repeated in each case after a number of pulse frames, corresponding to the number of intended groups. In order to clarify these connections it is assumed in the diagram shown in FIG. 2 that within the there shown time range W*n* message signals appear, which pertain to the same connections as they have already been assumed to be in connection with the diagram according to FIG. 1. In FIG. 2 the relation existing between the message signals appearing in each case and the address signals appearing in the time range I*b* of the pulse frame in question, is indicated by connecting of parentheses, comprising the ranges in each case, by means of an arrow. Thus the arrow connecting the parentheses entered in the first line in FIG. 2 indicates that the address signals appearing in the there indicated time range I*bl*, mark the connections in the course of which in the first seven time slots of the time range W*n* of the considered pulse frame PR message signals appear. Analogously, the connecting arrow in the second line in FIG. 2 shows, between time segment I*b*2 and time slots marked 11, 12 and 13, that the addresses of these time slots, or connections, in the course of which in time slots 11, 12 and 13 message signals are transmitted, are transmitted in the just mentioned time segment. Analogously the relations between time segments I*b*5 and I*b*6 and those time slots in which message signals are transmitted which pertain to connections the thereto pertaining addresses of which are transmitted in the just mentioned time segments, are shown. Subsequently the considered process begins again.

This should show that upon the application of the measure shown in FIG. 2 of sub-division of the individual connections into groups, or the address signals designating the connections in question, into individual groups, for the transmission of message signals a greater channel capacity is available than in the development form according to FIG. 1. If thereby the same channel capacity were made available for the transmission of message signals as is assumed in connection with FIG. 1, one could make do with shorter pulse frames, which would indicate that the repetition frequency with which the time slots of the individual time channels appear, could be increased. Now after the process according to the invention has been explained in principle with the aid of FIG. 1 and FIG. 2, the circuit arrangement shown in FIG. 3 shall now be considered, with the aid of which the process according to the invention can be carried out. The circuit arrangement shown in FIG. 3 comprises on the transmission side two signal registers SR1 and SR2, each of which contains a message signal register part WR*sl*, WR*s*2 and an address register part IR*s*1, IR*s*2.

Before the two registers SR1, SR2 provided on the transmission side a so-called activity detector AD is switched, which acts as supervision device. This activity detector AD is connected with its inlet to a PCM transmission line L*s*. With the aid of activity detector AD those connections are determined in the course of which message signals are transmitted, i.e. which exceed a specific given amplitude. For the determination of such connections the activity detector AD possesses a digital circuit DS. Thereby the individual message signals may appear on the transmission line L*e* in time slots of time channels which are permanently assigned per se to the connections in each case in the course of which the message signals are transmitted. In this connection it shall be noted that on line L*s* successively message signals of connections appear, the addresses of which succeed each other in a specific, preferably increasing, order of rank.

With the appearance of the message signals on the transmission line L*s* the digital circuit D*s* of activity detector AD transmits a "1" outlet signal, i.e. in each case at the times of appearance of these message signals. This "1" outlet signal is used, over switch S*s*2, for the marking of a storage place, pertaining to the connection in the course of which the message signal in question has been transmitted, in register parts IR*s* 1 or in register part IR*s*2. In addition the "1"-outlet signal emitted by the digital circuit, is conveyed to the one inlet of an AND gate GU, the other inlet of which is connected, over a delay link T, with the inlet of activity detector AD. Delay link T thereby possesses a delay time which is equal to the processing time of the digital circuit DS, serving as signal evaluation circuit. After the expiration of this delay time the message signal in each case is conveyed, over AND gate GU and switch S*sl* to the inlet of register stage WR *s*1, or WR*s*2. Into which of the two registers SR1, SR2 provided on the transmission side, the signals in question are stored depends on the position of switches S*s*1 and S*s*2. Within a pulse frame the switches S*s*1 and S*s*2 direct in each case the thereto conveyed signals to one of the registers SR1, SR2, provided on the transmission side. In register stages WR*s*1 and WR*s*2 the message signals are in each case stored in adjacent storage places. At the end of each pulse frame, the signals stored during the pulse frame in each case into the transmission-side register SR1, SR2 in each case are again taken out of this register and transmitted, over an OR member GO connected to the outlets of both transmission-side registers SR1, SR2, to a transmission line L*u*. This transmission line Lu leads to a message signal receiving station which essentially possesses two receiving-side registers ER1, ER2 with one address register part IRel, or IRe2, each and one message signal register part WRel, or WRe2, each. On the inlet side the two receiving registers ER1, ER2 are connected over a transfer means Se1 to transmission line Lu. Over this connection there are stored into the address register part IRel, or IRe2 of the receiving register ER1, ER2 in each case, within the pulse frame in each case, the address informations received in a preceding pulse frame on the transmission side by address register part IRsl, or IRs2 of the transmission register SR1, or SR2 in each case. Into the message signal register part WRel, or WRe2 of the receiving register ER1, ER2 in each case there are stored the message signals stored in a preceding pulse frame in the appropriate register part of one of the transmission register SR1, SR2, and now transmitted over transmission line Lu. With the aid of the address informations contained in the address register part IRel, or IRe2 of the receiving register ER1, ER2 in each case, the message signals stored in the thereto pertaining message signal register part WRel, or WRe2 in each case, are taken out of storage over message signal line Le during time slots which pertain to time channels which are assigned to those connections which are designated by the said address informations. Expressed in other words this means that on message signal line Le the message signals are again transmitted in the timely relations to one another in which they appeared on the transmission-side message signal line Ls.

As has already been explained in connection with the transmission registers SR1, SR2 shown in FIG. 3, also of the receiving registers ER1, ER2 within a pulse frame, in each case one is provided with signals transmitted over the transmission line Lu, while at the same time out of the other receiving register the message signals stored therein during the preceding pulse frame in each case are taken and are transmitted over transmission line Le. Thereby the message signals in question are, as mentioned, transmitted in time slots of time channels which are assigned to the connections in each case and are determined by the addresses transmitted in each case, i.e. address signals. This means that on the transmission side and on the receiving side in each case the same pulse rasters are used which comprise the time slots of the time channels assigned to the total of possible connections. In contrast thereto on transmission line Lu a smaller number of time channels, or time slots, is available.

Figure 3:
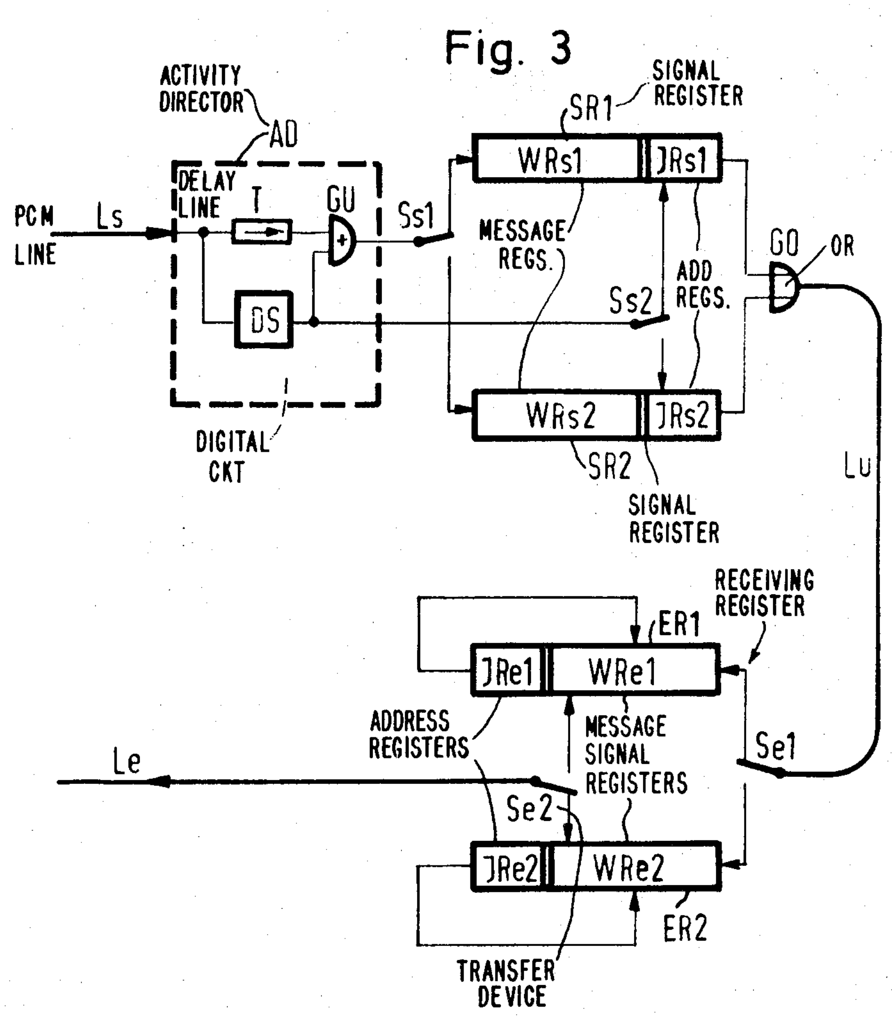
FIG. 3 shows a preferred construction of a transmission station and a therewith connected receiving station to carry out the process according to the invention.

In the diagram shown in FIGS. 1 and 2 and in the circuit arrangement shown in FIG. 3 the address informations are transmitted in each case prior to the message signals. However it shall be noted here that the signal information in question can, in principle, be transmitted also in a different sequence. With regard to the circuit arrangement shown in FIG. 3 it shall be noted in closing that this circuit arrangement can operate either according to the process of FIG. 1 or according to that of FIG. 2 in order to transmit message signals and address signals over transmission line Lu.

The above description of a preferred embodiment of the invention and a preferred mode for performing the method thereof are only exemplary. It is contemplated that changes and modifications may be made within the scope of the appended claims.

I claim:

1. A process for the transmission of PCM time division multiplex signals utilizing available time slots in a pulse frame from a transmission station to a receiving station, said signals comprising address signals designating connections and message signals directed to said connections, including assigning each of the time slots of a first time range pulse frame to one of said connections designated by an address signal, said time slots in said first range carrying message signals to said connections, and transmitting the address signals of the connections in an increasing order of rank in successive time slot elements and succeeding one another with a second time range separate from said first time frame of said pulse frame, each of said time slots in said second time frame containing an address signal consisting of one individual bit.

2. A process as claimed in claim 1 wherein in the transmission of each pulse frame one of said address signals is transmitted in said second frame for each of said time slots carrying message signals in said first frame.

3. A process as claimed in claim 1 wherein in successive pulse frames said second time range includes address signals identifying different ones of said message carrying time slots of said first time range.

4. A process as claimed in claim 3 further including the steps of dividing the address signals to be transmitted in said second time range designating the connections between sending and receiving stations into groups, and transmitting said groups in cyclic succession in consecutive pulse frames, the address signal of each of said message carrying time slots of said first range being repeated after the transmission of a number of frames equal to the number of groups.

5. Telephone exchange apparatus for the transmission of PCM time division multiplex signals in time slots in a pulse frame from a transmission station to a receiving station in a PCM transmission system said signals comprising address signals in the time slots in a first range of said pulse frame designating connections, said address signals each consisting of one bit and following each other in increasing order of rank, and message signals in the time slots in a second range permanently assigned to the connections, said transmission station including a message signal register having a storage capacity corresponding to a number of time channels available for transmission between said transmission station and said receiving station, an address signal register for storing one of said one bit address signals for each of said message supervision means for storing said incoming message signals in each of said pulse frames in said message signal register and for storing the address signal corresponding to each of said message signals in increasing order of rank in a sequence corresponding to the sequence of appearance of said message signals in said address signal register, and transfer means including a transmission line connected between said transmission station and said receiving station for forwarding the message signals and at least a portion of the address signals stored at said transmission station to said receiving station in a next succeeding pulse frame, said receiving station including an address signal and message signal register means for receiving and forwarding said message signals in accordance with said address signals during a next following pulse frame.

6. Telephone exchange apparatus as claimed in claim 5 including in said transmitting station and in said receiving station a second message signal register for storing message signals, and a second address register for storing addresses of messages in said second message register, and means for storing the pulse frames including said message and address signals alternately in said first and second message and address registers, and for forwarding said stored message and address signals in the next succeeding pulse frame.

7. Telephone exchange apparatus as claimed in claim 5 including supervision means coupled between an incoming PCM transmission line and said transmission station and including a signal evaluation means receiving said message signals for testing each signal for a predetermined minimum amplitude, a two input coincidence circuit having one input connected to said evaluation circuit to provide signals to said message signal register, and a delay line having a delay time corresponding to the processing time of said signal evaluation circuit, said delay line coupling each of the received message signals to the other input of said coincidence circuit.

8. Telephone exchange apparatus as claimed in claim 14 wherein the output of said evaluation circuit is coupled to a trigger input of said address register, whereby an address storage place is marked for each of said received message signals.

* * * * *